United States Patent [19]
Edgerton et al.

[11] 3,800,955
[45] Apr. 2, 1974

[54] SLUDGE REMOVAL MECHANISM

[75] Inventors: Philip Edgerton, Holicong; John Lodholz, Perkasie, both of Pa.

[73] Assignee: FMC Corporation, San Jose, Calif.

[22] Filed: May 25, 1973

[21] Appl. No.: 364,127

[52] U.S. Cl. .................................. 210/528, 137/577
[51] Int. Cl. .............................................. B01d 12/00
[58] Field of Search ............ 137/577; 210/528, 533

[56] References Cited
UNITED STATES PATENTS

| | | | |
|---|---|---|---|
| 2,086,955 | 7/1937 | Kivell | 210/528 |
| 3,166,502 | 1/1965 | Kelly | 210/528 |
| 3,298,529 | 1/1967 | Longnecker | 210/528 X |
| 3,371,788 | 3/1968 | Smith | 210/528 X |
| 3,494,462 | 2/1970 | Baud | 210/528 X |

*Primary Examiner*—Henry T. Klinksiek
*Attorney, Agent, or Firm*—Dressler, Goldsmith, Clement & Gordon, Ltd.

[57] ABSTRACT

A sludge removal mechanism is disclosed for withdrawing sludge that has settled to the bottom of a tank. The mechanism includes a concentrating means for concentrating the settled sludge in a localized area on the tank bottom and conduit means including at least two conduits leading from one localized area to a collection zone with selection means cooperating with the conduits to selectively connect any one or all of the conduits to the collection zone to vary the range of flow from the localized area to the collection zone.

14 Claims, 5 Drawing Figures

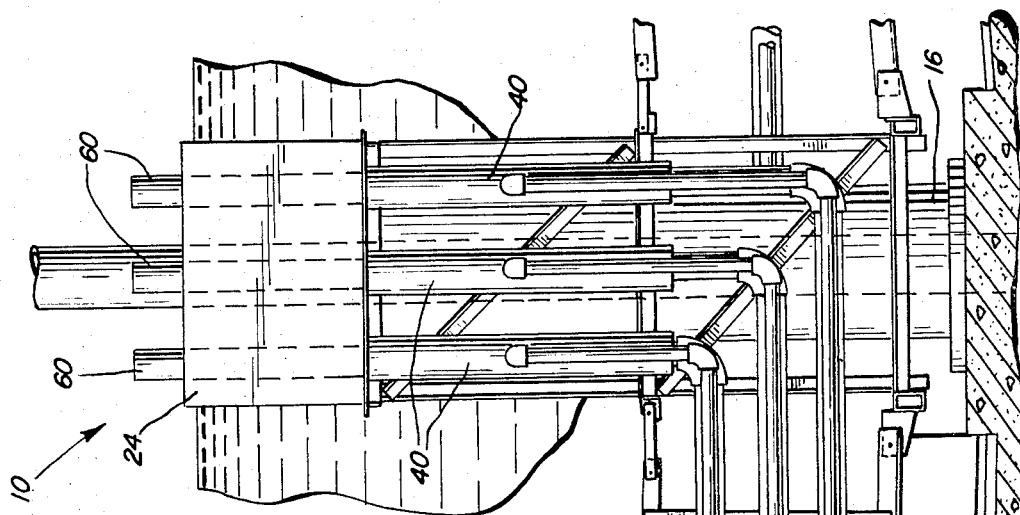
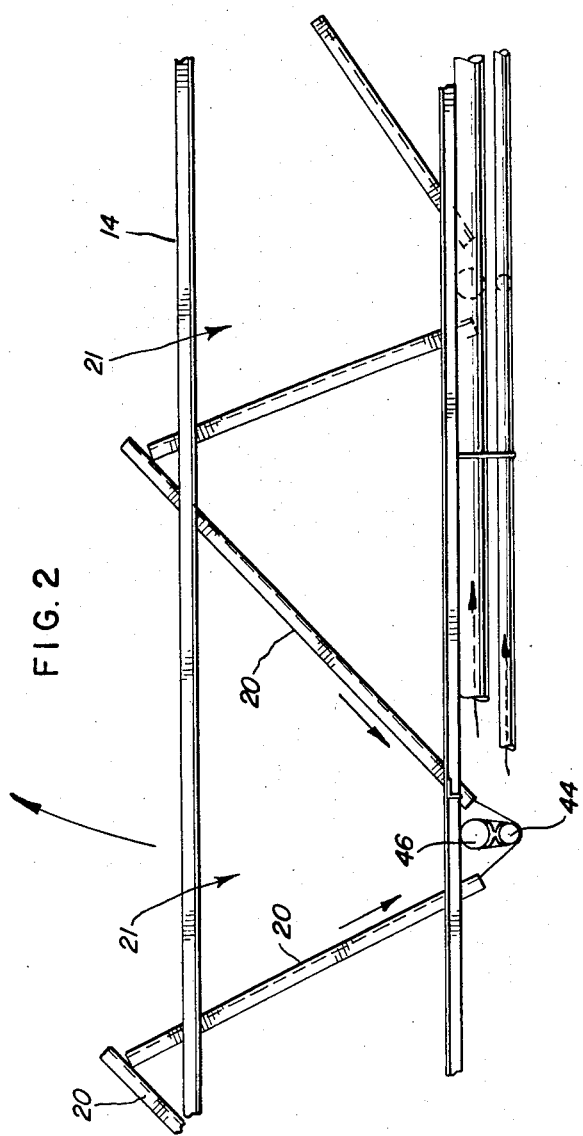
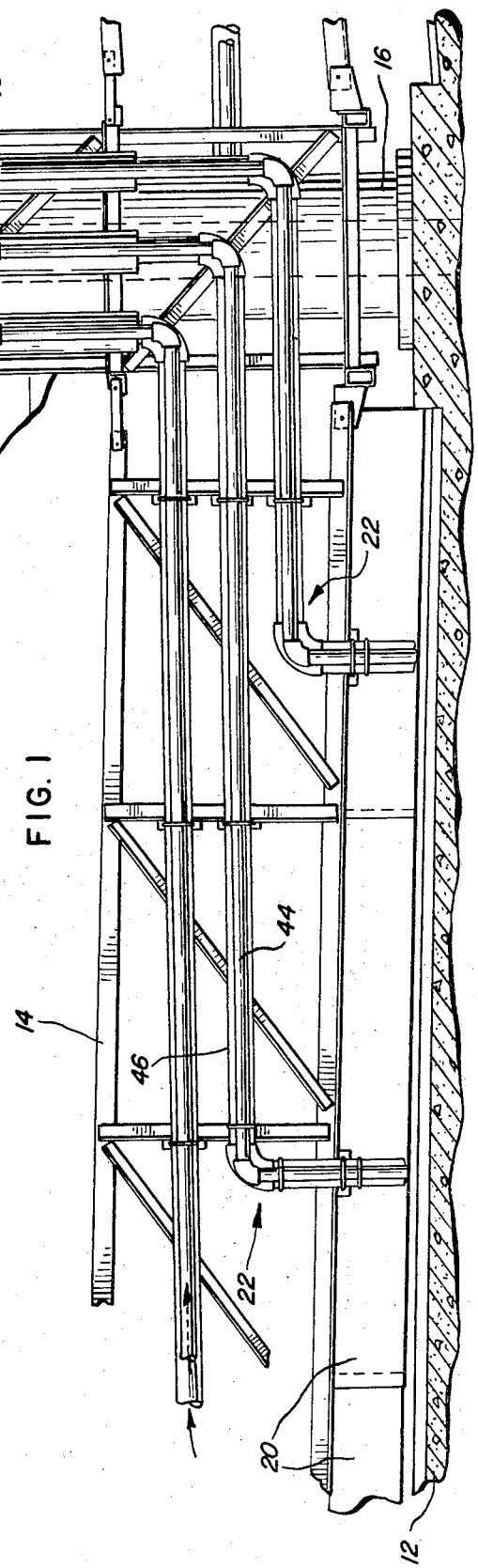

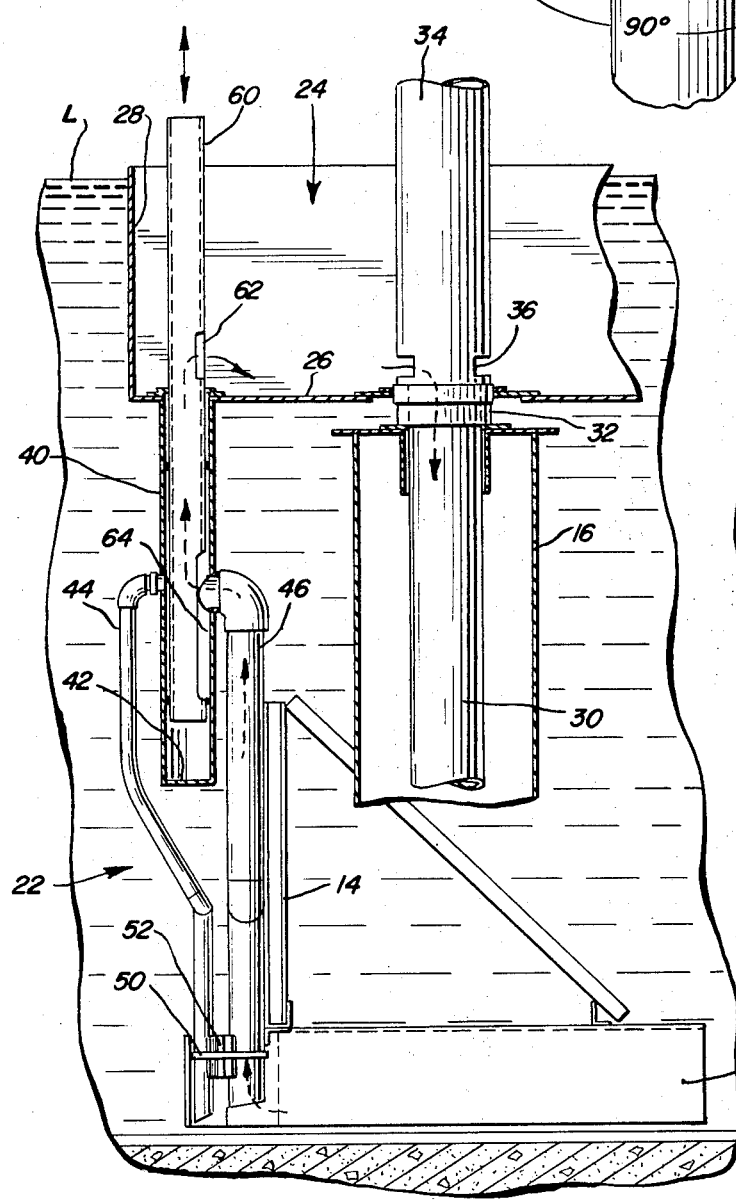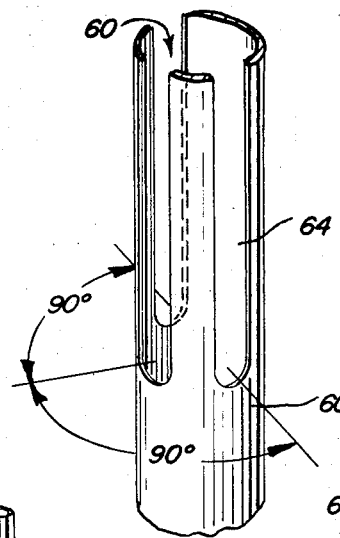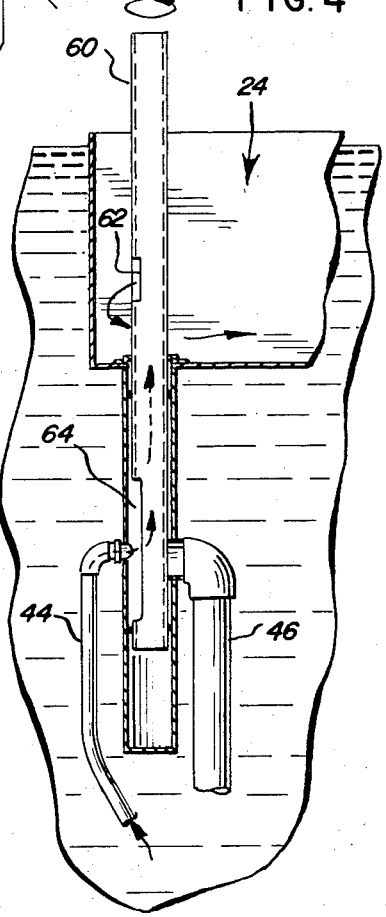

SLUDGE REMOVAL MECHANISM

BACKGROUND OF THE INVENTION

In recent years, the hydraulic removal of settled sludge from the bottom of clarifiers or settling tanks in an activated sludge treatment plant has become increasingly common. The hydraulic removal of settled sludge is accomplished by producing a hydraulic head differential between the liquid in the tank and a collection zone that receives the settled sludge or solids so that the hydraulic gradient between the liquid in the tank and the liquid in the collection zone or sludge well will cause the sludge to flow through pipes that extend from the bottom of the tank into the sludge well. Usually, the apparatus for withdrawing settled sludge will incorporate some type of adjustment to vary the amount of flow from the tank bottom to the sludge well.

In systems such as this, the maximum velocity of the material flowing through the sludge withdrawl pipes is limited by the hydraulic gradient or head differential that can be established between the surface of the liquid in the tank and the surface of the liquid in the sludge well. In these systems, there is also a minimum velocity that can be established without having the sludge settle out of the liquid flowing through the pipes.

In recent years, there has been considerable demand for designing settling tanks in activated sludge treatment plants that will produce a wide range of flow through the sludge withdrawal mechanism. There is no difficulty in increasing the amount of flow that can be developed since this can be accomplished by increasing the diameter of the sludge withdrawal pipes that form part of the removable mechanism. However, such solution is not always feasible in that it automatically increases the minimum flow that the system is capable of handling. The minimum flow is determined by a minimum velocity that is sufficiently high to hold the sludge in suspension as the liquid is flowing through the pipes or conduits.

This problem has been a serious drawback in designing systems for an initial minimum capacity for a given facility and still allow for a large increase in capacity should the needs of the facility require.

SUMMARY OF THE INVENTION

The present invention provides a simple expedient for providing a wide range of flow that can be handled in a hydraulic sludge removal mechanism.

This wide range of flow is accomplished by adding a second conduit to the sludge withdrawal mechanism, which heretofor included one sludge concentrating means in the bottom of the tank for each conduit that leads from the bottom of the tank to the sludge collection zone or well.

By properly sizing the diameters of the two conduits, one conduit can be utilized for developing a first or low range of flow of sludge while the second conduit will be capable of developing an intermediate range of flow and the combination of both conduits will develop a high range of flow.

BRIEF DESCRIPTION OF SEVERAL VIEWS OF DRAWINGS

FIG. 1 is a fragmentary side elevation view of a sludge removal mechanism having the present invention incorporated therein;

FIG. 2 is a fragmentary plan view of the sludge removal mechanism shown in FIG. 1;

FIG. 3 is an enlarged vertical elevation view, partly in section, showing the sludge removal mechanism of FIG. 1;

FIG. 4 is a fragmentary view of the elements shown in FIG. 3; and

FIG. 5 is a fragmentary perspective view of one of the elements of the sludge removal mechanism.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawing shows a sludge removal mechanism, generally designated by the reference numeral 10, for withdrawing sludge that has settled to the bottom of a clarification or settling tank. Only the bottom wall 12 of the tank has been shown in FIG. 1 and the sludge removal mechanism illustrated is for use in a circular tank. However, it will be appreciated that the same mechanism could be used in a rectangular tank.

Sludge removal mechanism 10 includes a frame structure 14 that is supported for rotation on a column 16, which is located in the center of the tank. The supporting structure may consist of one or more arms extending radially from the column 16.

Supporting structure or frame 14 has a plurality of blades 20 secured thereto and each adjacent pair of blades is arranged to define a substantially V-shaped plow 21 with the bases of the V-shaped plows being located on the trailing side of the frame structure when considered in the direction of travel of the frame. The V-shaped plows act as concentration means for concentrating settled sludge in a localized area on the bottom of the tank as the frame structure moves along the tank floor. The sludge removal mechanism also includes conduit means 22 leading from the base of each V-shaped plow to a collection zone 24 that is rotated with the frame structure 14 on column 16.

As most clearly shown in FIG. 3, the collection zone or means 24 consists of a circular trough that has a bottom wall 26 which is located below the liquid level L in the tank and a side wall 28 extending from the periphery of bottom wall 26 with the upper edge of side wall 28 extending above the liquid level L in the tank. Bottom wall 26 has a conduit 30 communicating therewith which extends through the hollow column 16 and defines the outlet for sludge that is received into the trough or collection 24. A suitable bearing structure 32, may be interposed between conduit 30 and trough 24 to allow rotation of the trough relative to the fixed conduit 30. The collection zone also has a conduit portion 34 defining an extension of conduit 30 with openings 36 that allow sludge to pass from the trough into conduit 30.

Each conduit means 22 communicates with trough 24 through a separate tube or pipe 40 that has an upper open end surrounding an opening in the trough and a lower closed end 42. Each conduit means 22 consists of first and second conduits 44 and 46 that have upper ends conected to opposite sides of tube 40 and lower open ends in communication with the base of an associated V-shaped plow.

As most clearly shown in FIGS. 2 and 3, the smaller conduit 44, is located in the base of the V-shaped plow defined by blades 20 while the larger conduit 46 is located immediately adjacent the leading surface of the first conduit when considered in the direction of travel of the sludge removal mechanism. The lower ends of the conduits 44 and 46 are held in fixed relation relative to the plows and the frame 14 by suitable brackets 50 and spacers 52 located between each pair of conduits. Also, the lower ends of the respective conduits 44 and 46 are tapered upwardly from the trailing edge to the leading edge of each conduit 44 and 46 to allow the sludge to flow into the conduits.

The flow of settled sludge through the respective conduits 44 and 46 is controlled by a valve 60 that has its lower end received into tube 40 and has at least one opening 62 located above the bottom wall of trough 24. The valve or valve element 60 also has a plurality of slots or openings 64 that are vertically aligned with the open ends of the respective conduits 44 and 46.

The operation of the sludge removal mechanism will now be described. Assuming that the frame structure 14 is rotating in the direction of the arrow indicated in FIG. 2, all of the sludge on the tank bottom that is located between the leading edges of each pair of blades 20 which define a V-shaped plow is concentrated in a localized area defined by the base of the V-shaped plow. The sludge that is concentrated at the bases of the respective V-shaped plows flows through the conduit means 22 to trough 24 because the openings 62 of valve elements 60 are located below the liquid level L in the tank to produce a hydraulic head differential of the liquid in the tank and in the valve elements.

The amount of sludge, consisting of settled solids and a certain amount of liquid that flows through the conduit means, is controlled by rotation and vertical movement of valve element 60. During the rotation of valve element 60, the valve element acts as a selection means cooperating with the conduit means for selectively connecting either or both conduits 44 and 46 with the trough 24. Thus, in the position shown in FIG. 3, the conduit 44 is blocked and conduit 46 communicates through slot 64 with trough 24 so that all of the sludge that is collected in an associated V-shaped plow 21 passes through conduit 46. When valve 60 is in the position shown in FIG. 4, a slot 64 is aligned with conduit 44 and conduit 46 is blocked so that all of the concentrated sludge passes through conduit 44. In a third position for the valve 60, a slot 64 is aligned with each of the conduits 44 and 46 so that concentrated sludge may pass through both of the conduits.

Vertical movement of the valve elements 60 which are part of collection means 24, will control the rate of flow through the conduits in communication with the trough or collection zone 24 and will establish minimum and maximum flow rates through the conduits. This is necessarily so because vertical movement of valves 60 will determine the position of the opening 62 relative to the liquid level L in the tank. Stated another way, the vertical position of the opening 62 relative to the liquid level in the tank will determine the head differential between opposite ends of the conduits 44 and 46 and therefore will determine the velocity of flow of the materials through the conduits. Another method of controlling the flow through conduits 44 and 46 is to lower the tube 60 until a portion of opening 62 is below wall 26, thus throttling the opening.

Summarizing, when only conduit 44 is in communication with trough 24 a low flow range can be established through vertical movement of valve element 60, an intermediate flow range can be established by vertical movement of valve element 60 when only conduit 46 is in communication with trough 24 and a high flow range can be established when both conduits are in communication with trough 24.

While this invention is not limited to any size, configuration or number of conduits that are associated with each V-shaped plow, a specific example will be illustrated for a given treatment facility that requires a range of flow between 40 and 500 gallons per minute. If the diameter of the second conduit or pipe 44 is four inches and the diameter of the second conduit or pipe 46 is eight inches, the first pipe being in communication with trough 24 will have a minimum flow of 40 gallons per minute with the vertical position of valve element 60 set to produce a velocity of one foot per second of the material flowing through the tube. This is the minimum velocity that is possible without having the sludge settle out from the liquid flowing through the conduits. This minimum flow may be considered to be the design flow for the material through conduit 44. By lowering valve element 60, the velocity can be increased to approximately 3.2 feet per second at which velocity the flow will be increased to approximately three times the design flow for the minimum velocity.

By rotating valve element 60 to have only the second conduit 46 in communication with trough 24 a second flow range can be produced by vertical movement of the valve element with respect to liquid level in the tank. Again, in this instance, the minimum velocity would be set at one foot per second which would develop a flow rate of approximately 120 gallons per minute while a maximum velocity of approximately 3.2 feet per second through the conduits 46 would develop a flow rate of approximately 360 gallons per minute. If a larger rate is desired, it is only necessary to rotate the valve element 60 to a position where both conduits are in communication with the trough 24 and by vertical positioning of the valve element 60, the flow may be increased to a maximum of approximately 500 gallons per minute.

It will now be appreciated that the present invention provides a simple and practical design for substantially increasing the flow rate through the sludge removal mechanism of a settling or clarification tank. With an arrangement such as that described above, the clarification tanks for a treatment facility can readily be designed to accomodate a substantial increase in the amount of the material that must be treated during a given period of time.

While the sludge removal mechanism has been described in connection with a circular tank, this arrangement could readily be incorporated into a rectangular tank and the sludge could be collected by having the frame structure travel in only one direction or sludge could be withdrawn when the bridge is traveling in either direction by the addition of a second set of V-shaped plows. Also, any number of conduit means and plows may be incorporated, dependent upon the design of the system. Furthermore, additional conduits could be included into each conduit means to further vary the range of flow. Also, the flow of materials through the conduit means could be produced by means other than the hydraulic head differential, such as air lifts co-operating with the respective conduits.

We claim:

1. A sludge removal mechanism for withdrawing sludge that has settled to the bottom of a settling tank and depositing the sludge in a collection zone located above the bottom of the tank comprising: concentrating means for concentrating the settled sludge in at least one localized area on the tank bottom; conduit means including at least two conduits leading from at least one localized area to said collection zone; and selection means cooperating with said conduit means for selectively connecting any one of said conduits and all of said conduits to said collection zone to vary the range of flow from the localized area to the collection zone.

2. Sludge removal mechanism as defined in claim 1, in which said concentrating means includes a V-shaped plow having a base defining said localized area.

3. Sludge removal mechanism as defined in claim 2, in which said conduit means includes first and second conduits and the second conduit has a substantially greater opening than said first conduit and said first conduit is located in the base of said V-shaped plow while said second conduit is immediately adjacent said first conduit.

4. Sludge removal mechanism as defined in claim 3, in which said tank is circular and said sludge removal mechanism is rotated in one direction about the center of said tank.

5. Sludge removal means as defined in claim 1, in which the collection zone includes a trough having a bottom wall located below the liquid level in the tank and in which said conduit means includes first and second conduits communicating with the trough through the bottom wall and the flow of sludge through said conduit means is produced by hydraulic head differential of the liquid between said tank and said trough.

6. Sludge removal means as defined in claim 5, in which said collection zone further includes a tube communicating with the bottom of said trough and closed at its lower end with the upper ends of said conduits connected to said tube.

7. Sludge removal mechanism as defined in claim 6, in which said selection means includes a valve element rotatable with respect to said tube for selectively blocking flow through either of said conduits.

8. Sludge removal mechanism as defined in claim 7, in which said valve element is vertically movable with respect to said tube to vary the rate of flow from said localized area to said trough.

9. Sludge removal mechanism as defined in claim 8, in which said conduits each have a minimum and maximum flow rate and in which the maximum flow rate of said first conduit is substantially equal to the minimum flow rate of said second conduit so that (1) a low flow range can be produced when only said first conduit is in communication with said tube, (2) an intermediate flow range can be produced when only said second conduit is in communication with said tube and (3) a high flow range can be produced when both conduits are in communication with said tube.

10. Sludge removal mechanism as defined in claim 9, in which said concentrating means includes a V-shaped plow movable in one direction across the tank bottom to concentrate the settled sludge at the base of the plow and in which said first conduit is located in the base of the plow and the second conduit located immediately adjacent the leading surface of the first conduit.

11. A sludge removal mechanism for withdrawing sludge that has settled to the bottom of a tank comprising: concentrating means for concentrating the settled sludge in at least one localized area of the tank bottom; collection means located above the tank bottom for receiving settled sludge; first and second conduits having opposite ends respectively in communication with one localized area and said collection means, said conduits each having a minimum and maximum flow rate with the maximum flow rate of said first conduit being substantially equal to the minimum flow rate of said second conduit; selection means for selectively blocking flow through said conduits so that (1) a low flow range can be produced when only said first conduit is in communication with said collection means, (2) an intermediate flow range can be produced when only said second conduit is in communication with said collection means, and (3) a high flow range can be produced when both conduits are in communication with said collection means.

12. Sludge removal mechanism as defined in claim 11, in which there are a plurality of spaced movable concentrating means located in the tank with first and second conduits leading from each localized area to said collection means and selection means cooperating with each pair of conduits.

13. Sludge removal mechanism as defined in claim 12, in which the collection means has a bottom wall located below the liquid level in the tank and the flow of liquid is produced by hydraulic head differential between the liquid in the tank and the collection means.

14. Sludge removal mechanism as defined in claim 13, in which said collection means includes a vertically movable valve element cooperating with each pair of conduits to vary the flow rate through said conduits and in which said valve elements define said selection means.

* * * * *